United States Patent [19]

Asija

[11] Patent Number: 4,523,331
[45] Date of Patent: Jun. 11, 1985

[54] AUTOMATED IMAGE INPUT, STORAGE AND OUTPUT SYSTEM

[76] Inventor: Satya P. Asija, 7 Woonsocket Ave., Shelton, Conn. 06484

[21] Appl. No.: 424,731

[22] Filed: Sep. 27, 1982

[51] Int. Cl.³ ............................................. G06K 9/00
[52] U.S. Cl. ........................................ 382/18; 382/30
[58] Field of Search ....................... 382/18, 34, 37, 57, 382/3, 30, 61

[56] References Cited

U.S. PATENT DOCUMENTS

| | | | |
|---|---|---|---|
| 3,271,738 | 9/1966 | Kamentsky | 382/57 |
| 3,492,646 | 4/1965 | Bene et al. | 382/30 |
| 3,609,686 | 7/1969 | Savory | 382/30 |
| 3,732,366 | 5/1973 | Bolie | 382/34 |
| 4,156,911 | 5/1979 | Crane et al. | 382/3 |
| 4,208,652 | 6/1980 | Marshall | 382/18 |
| 4,218,673 | 8/1980 | Yoshida | 382/18 |

*Primary Examiner*—Leo H. Boudreau
*Assistant Examiner*—Michael M. Murray
*Attorney, Agent, or Firm*—S. Pal Asija

[57] ABSTRACT

A computer algorithm and apparatus for automated image input (including recognition), storage and output (including image generation) is described. Each image is transformed into a unique binary number and then stored as such. This unique binary number is obtained by adding unique binary value of each pixell present in that image. Means for processing handwriting and colored images are also disclosed. Image recognition and matching takes place by comparing the binary value of the new image received against all images stored in the descending order of difference in binary values. Thus the computer is able to recognize bad handwriting even when the difference between the ideal or stored samples on the one hand and the new image is substantial without consistency. The computer also stores data about its errors as well as corrections received from the user. For this and other reasons each user has a unique number.

15 Claims, 12 Drawing Figures

*Fig. 3d*

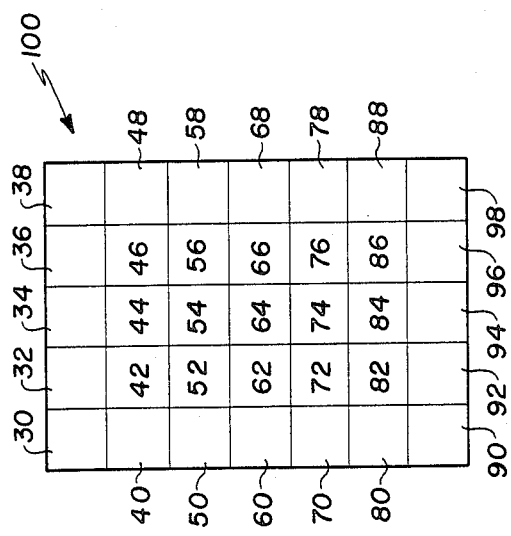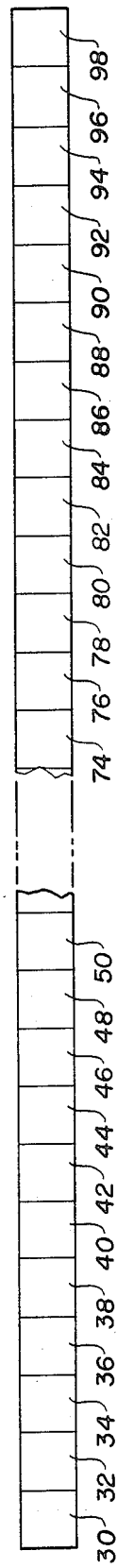
Fig.3b
Fig.3c

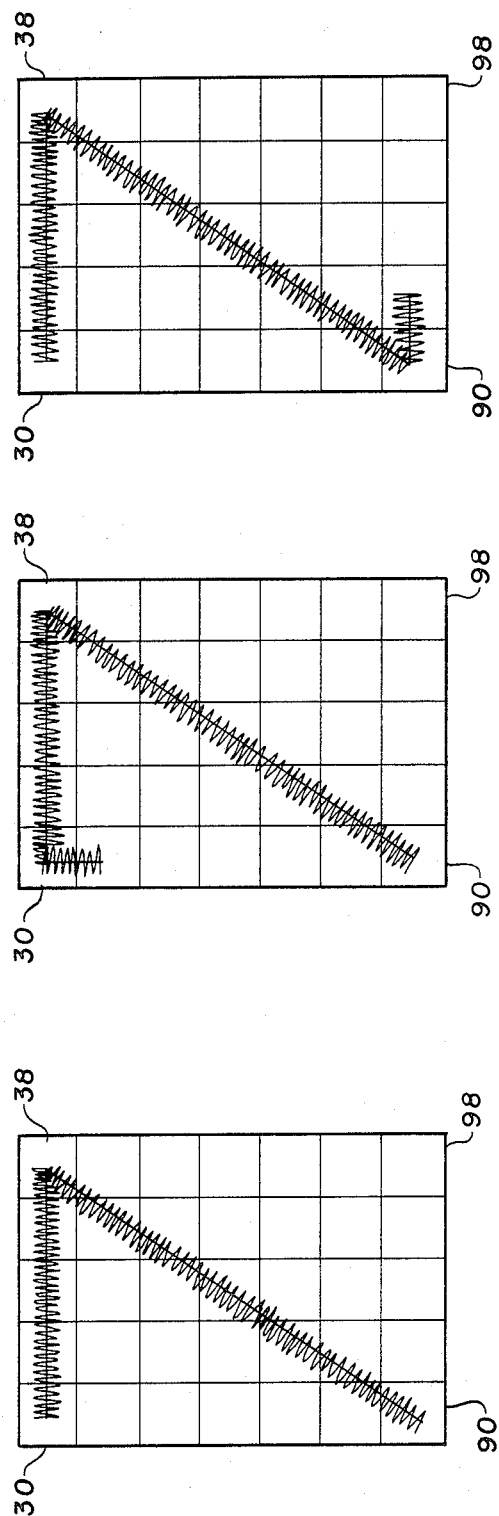

AUTOMATED IMAGE INPUT, STORAGE AND OUTPUT SYSTEM

RELATED INSTRUMENT

This invention is a logical extension of the invention claimed by the same applicant under application Ser. No. 537,551 filed Dec. 30, 1974 which issued as U.S. Pat. No. 4,270,182 on May 26, 1981. The invention is also related to Bar Code Reader by Applicant, U.S. Pat. No. 3,796,862.

FIELD OF THE INVENTION

This invention relates to input, recognition, storage, generation and output of images of all types including handwriting, color, man made images and machine made images.

BACKGROUND OF THE INVENTION

The effectivness and efficiency of any automated system depends greatly on efficacy and efficiency of man machine interface.

To improve this interface it is frequently desireable that machine be capable of accurately comprehending source documents of human origin such as handwriting and art images without the need for converting such source documents into a conventional machine readable form such as magnetic or paper card, tapes, drums or the like.

BRIEF DESCRIPTION OF THE PRIOR ART

Best examples of prior art can be found in a technical library under such headings as Expert Systems, Artificial Intelligence, Artificial vision, Heuristic programming and Robotics. All prior art systems known to the applicant where man machine interface is either voice or handwriting the accuracy is limited to 90% approximately. Some prior art systems have stretched this accuracy by a couple of percentage points by adding extremely complex correlation data and thereby making the whole system cost prohibitive.

OBJECTIVES OF THE INVENTION

It is an objective of this invention to provide a simple spontaneous, efficient reliable and accurate method of man machine interface.

Another objective of the automated image input storage and output system of this invention is that it can be used with a plurality of languages, images, handwritings, voices, dialects accents, images and colors concurrently.

Another objective of this invention is that it can be used in conjunction with any general purpose electronic digital computer or equivalent system of the future.

Another objective of this system is that man and machine are capable of learning from each other.

Another objective of this invention is to alter, add, amend, input, store, output, recognize, compare and generate information and images using physical devices, agents and effects so as to make the information and images more readily, efficiently, accurately and objectively changeable, retreieveable and useable.

Another objective of this invention is to store information and images in digital form.

Another objective of this invetion is to permit the unskilled personnel to do complex, time consuming work in a novel, simple and efficient way with little training, and to free skilled personnel for even more creative tasks.

BRIEF DESCRIPTION OF THE DRAWINGS

FIG. 3 (*a*) shows an M by N pixel matrix.
FIG. 3 (*b*) is a rectangular version of 5×7 pixels and
FIG. 3 (*c*) is a linear version of the same.
FIG. 4 (*a*), (*b*), (*c*) show numeral 7 with minor variations of handwriting and or recognition.

DETAILED DESCRIPTION OF THE PREFERRED EMBODIMENT

The automated image input, recognition, storage, generation, retrieval and output is made possible in this invention by dividing an image into a plurality of smaller images as a function of the size of the original image and the degree of resolution. Each said small image is then viewed as a matrix of M and N pixels.

One of the prime applications of image recognition is in the area of handwriting recognition. For handwriting recognition in English with only a 26 character alphabet and a 10 numeral decimal system a matrix of 5 by 7 pixels per character is deemed sufficient and is therefore used in this disclosure merely as an example.

Each pixel in the matrix is given a unique binary power number which is a power of two. This automatically ensures that sum of any unique number of pixels in a matrix is also a unique binary number which can be stored and processed by any general purpose digital computer.

Examples of binary power numbers are 1,2,4,8,16 etc. Examples of non-binary power numbers are 3,5,6,7,9,10 etc. It should be however noted that the sum of binary power values is never a binary power value unless duplication occurs. The applicant does not use any duplication and therefore in applicant's invention the sum of binary power values of pixels is always a non-binary power value. This fact is one of the basis of this invention which no prior art system uses. This technique is not the same as and in no way resembles weighting factor known in the prior art.

Figure 1:
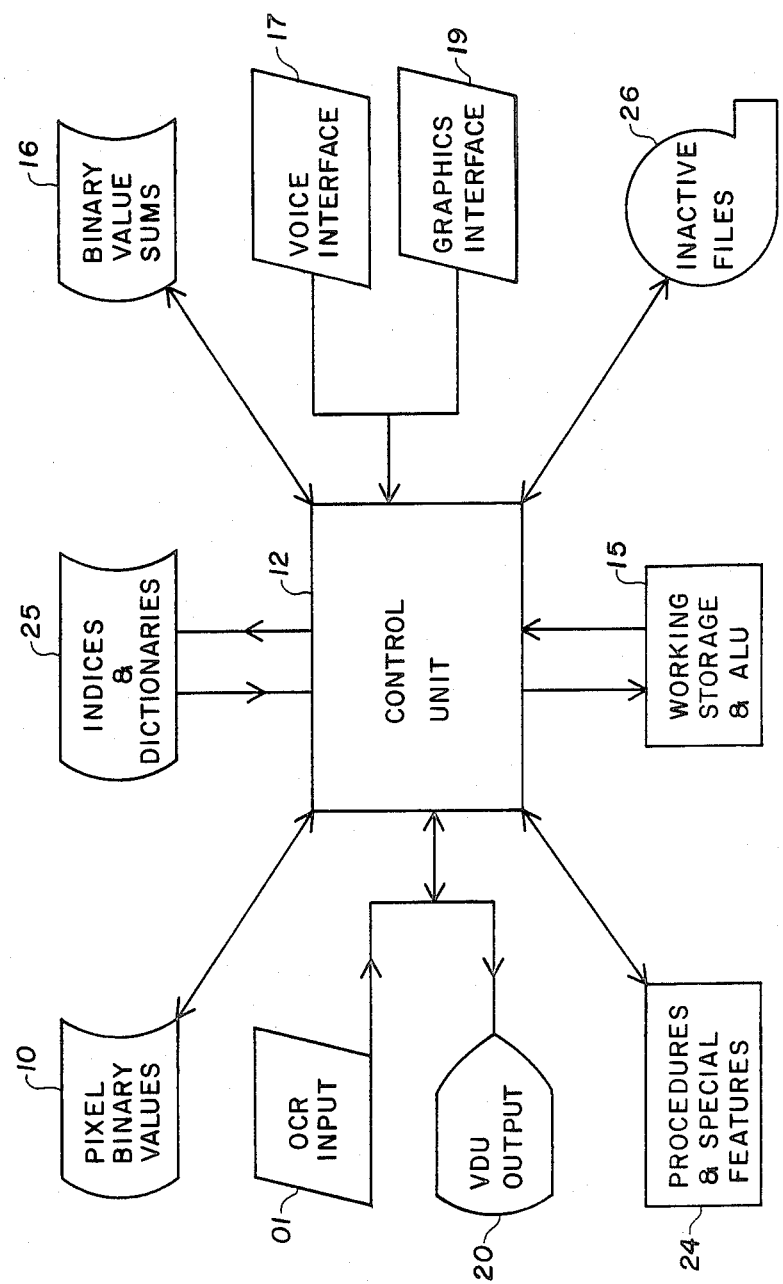
FIG. 1 is a block diagram of the invention.

As shown in FIG. 1, the automated image input, recognition, storage, processing, generation output and retrieval system comprises the following units:

(a) a control unit (12)
(b) an input device (01) such as an OCR (Optical Character Reader) or an alphanumeric terminal with display.
(c) an output device (20) such as a VDU (Visual Display Unit)
(d) an arithmatic and logic unit and concomitant working storage (15) as part of the main frame memory.
(e) a pixel binary power value storage device (10) such as an on-line disc memory.
(f) a binary value sum storage device such as an on-line disc memory for storing binary value sums of matrices and small images derived as a function of information in pixel binary values (10). This sum is never a binary power.
(g) Indices and Dictionary storage unit (25) as main frame storage or on-line disc.
(h) Procedures and special features storage (24)

(i) Voice interface (17) and graphics interface (19)
(j) inactive files storage (26) on magnetic tape.

As can be readily seen from FIG. 1 the control unit is connected to remaining units in such a way that under the direction of the control unit information can be transferred from any unit to any other unit in the system.

Figure 2:
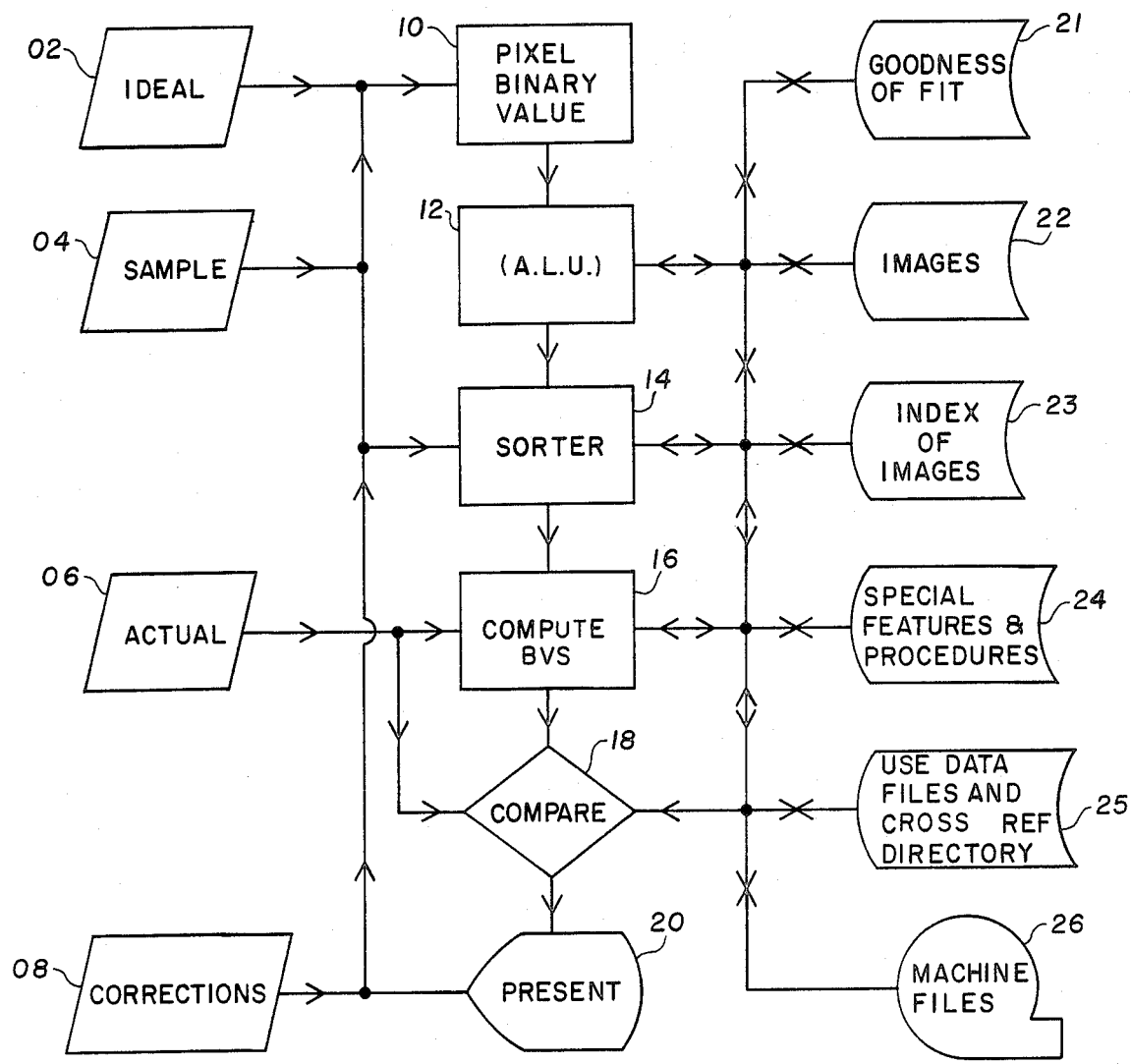
FIG. 2 is a system flow diagram of the Automated Image Recognition Input, Storage, Retrieval, Generation and Output system of this invention.
Figure 5A:
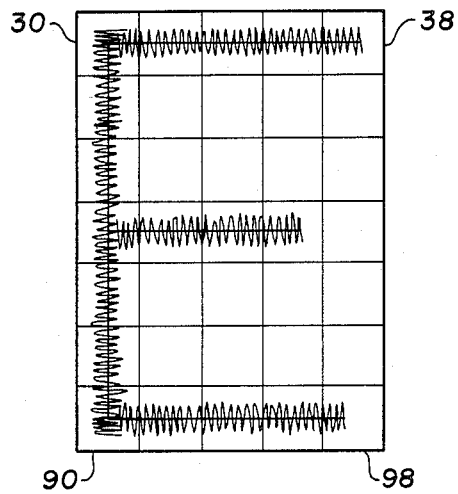
FIG. 5 (*a*), (*b*), (*c*), and (*d*) show the transformation of letter 'E' to 'F'
Figure 5B:
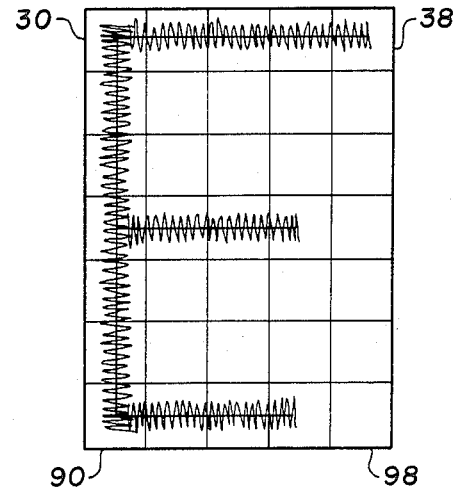
Figure 5C:
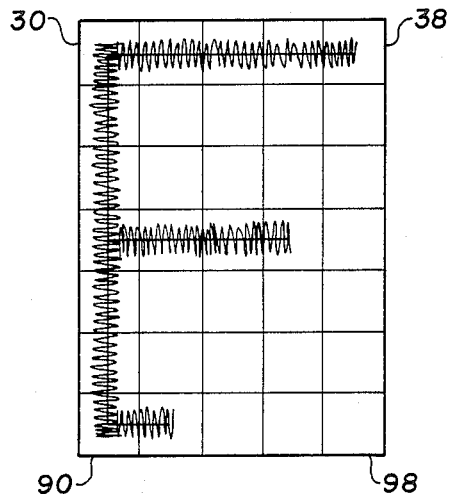
Figure 5D:
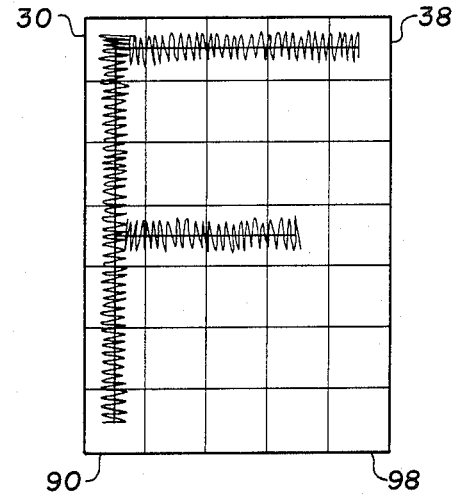

As shown in FIG. 2 the binary value sum of user sample input as well as ideal or normalized image input are calculated in advance of actual use, whereas binary value sums of actual user inputs and user correctional inputs are calculated in real time. Processing steps which can be performed on most electronic general purpose digital computers include addition, subtraction, indexing, comparing, scaling, computing, reading, displaying and making programmed decisions.

As shown in FIG. 2 the system has provision for plurality of inputs, plurality of storages and plurality of processing steps. The system flow chart shows only one visual display unit (20) but in reality a plurality of output devices to suit the needs of the user may be utilized.

The ideal image input (02) and user sample input (04) are generally input to the system somewhat advance of its actual use. Actual user input (06) who is one of the persons whose sample has been previously stored via (04) is done in real time. Also the user correction input (08) based upon the inability of the machine to recognize a users handwriting accurately are also input in real time.

The processing blocks 10 through 18 enable the system to perform a varity of processing steps such as the following:
(a) scaling an image/character to snugly fit a matrix of 5 by 7 pixels;
(b) adding the binary power value of each pixel in a matrix in which signal is present above a certain threshold;
(c) comparing this binary value sum to binary value sum of ideal image input, user sample input and the user correction input databases (not applicable for new samples or ideals);
(d) calculating goodness of fit with nearest binary value sums in case there is no exact match;
(e) arranging characters according to goodness of fit calculated in step (d) supra; this is essentially the difference between the sample being recognized and the stored samples' binary value sums;
(f) presenting characters to the user according to descending order of goodness of fit as established in step (e) supra until the user acknowledges that the machine has accurately recognized that character; and
(g) storing the user correction in the database in case the system is unable to correctly recognize the character even after multiple attempts.

Figure 3D:
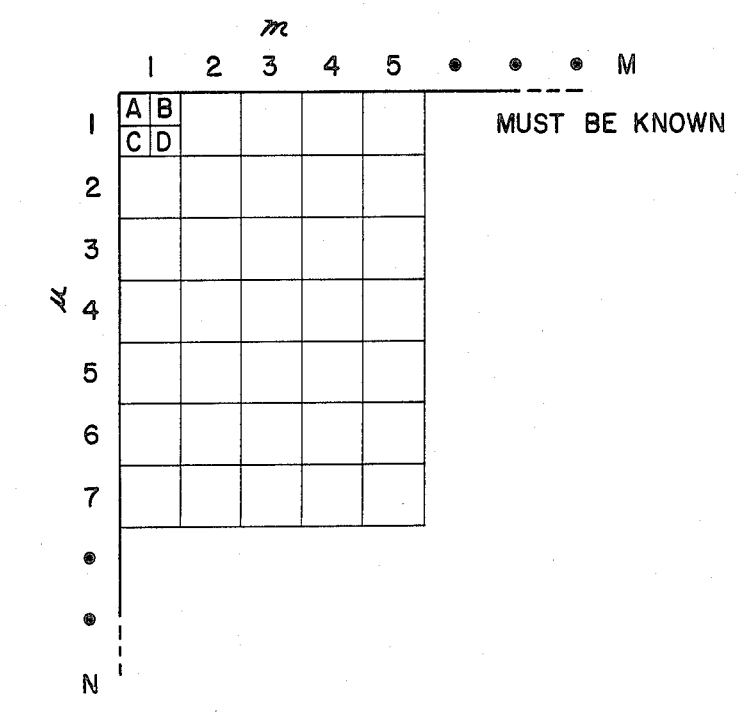

As shown in FIG. 3 an alphanumeric character can be represented by 35 binary bits of one or zero depending upon whether or not image corresponding to that pixel is above a threshold of predefined darkness, colour, contrast or some other criteria. The presence or absence of a pixel as one or zero is a binary decision. Even if this decision is somewhat wrong and arbitrary it is not detrimental to the recogntion of a persons handwriting by the system. Furthermore it is anticipated that even a person who has a highly consistent handwriting will have enough variations so as to give significantly different binary value of the same character when read by a machine under different ambient conditions. It is also possible that portions of a line will vary in darkness, thickness, contrast etc., but none of these can affect image recognition capability of the system to a significant degree. This is so because the handwriting recognition capability of this machine system is more a function of consistency of handwriting and reasonable differentiation from other resembling characters rather than accuracy and legibility to human beings. Fortunately the handwriting of a person changes gradually. Even during and after emotional and physical stress this consistency persists at least for short periods. The machine has no difficulty in accurately reading a person's 'a' even if it looks like some other person's 'o' as long as it does not look like same person's 'o'. All this is possible because in the inventor's system an error of omission (absence of mark) or commission (presence of mark where there should be none) on a higher value pixel is no more detrimental than a similar error of omission or commission on a lower value pixel as far as recognition capability of the system is concerned. As far as that goes the system is flexible enough that it will permit each user to redefine his alphabet set and the machine will generate correct output in English as if the user had been using the normal english alphabet set.

One of the applications of the automated image input, recognition, storage, processing, generation, output and retrieval system is in the area of handwriting recognition which can be performed by following algorithmic steps on most electronic digital computers that conform to the configuration of FIG. 1.
(a) scanning an image;
(b) subdividing the image into smaller images of manageable size if necessary;
(c) scaling each said small image to snugly fit an M by N matrix of pixels such as a 5×7 matrix with 35 pixels;
(d) assigning each pixel a unique binary power value as a power of 2;
(e) adding binary power value of pixels with signal above a predefined threshold;
(f) storing said binary value sum along with appropriate nomenclature and identification data such as user I.D., image name, or other suitable accessing or correlational information;
(g) comparing binary value sum to binary value sums of previously stored images, if any;
(h) calculating goodness of fit as a result of comparison made in step (g) supra.
(i) presenting images to the on-line user in descending order of goodness of fit;
(j) storing the new image in case of no match or in case of correctional information from the user as in step (f) supra., for later reference.

It should be noted that some storages in the system are temporary and others permanent. For example ideal and normalized inputs as well as user sample inputs are stored on more permanent storage whereas actual user inputs when there is a match are stored only temporarily and when there is no match it is stored as correctional information more permanently.

The image recognition capability can be understood by understanding character recognition capability which is illustrated here with numeral '7' in FIG. 4 and english character 'E' or 'F' in FIG. 5. After scanning and scaling of the character one must calculate binary value sum of the character, To calulate binary value sum one needs binary power value of each pixel where signal above a certain threshold is present as decided by the OCR (Optical character reader hardware). The binary value of a pixel is also funtion of the size of the matrix.

FIG. 3 (a) shows a generic matrix of M by N pixels. The binary value of the pixel whose cordinates are m,n can be calculated as follows: As a general rule the binary value of any pixel is 2 raised to the power of x, where $x=(n-1)M+m-1$ and wherein further M = Number of pixels horizontally or in other words number of columns in the matrix.

N = Number of pixels vertically or in other words number of rows in the matrix.

m,n = Cordinates in the direction of M and N respectively for the pixel whose binary power value is desired.

It should be further noted that the binary power value of a pixel is a function of M but not N. However it is both a function of m, and n (small).

FIG. 3b shows a 5 by 7 matrix with 35 pixels.

FIG. 3c shows the same matrix arranged linearly, which is more common configuration for the computer.

The binary power value of each pixel in a 5 by 7 matrix has been calculated using the above formula and is reproduced here for easy reference of the reader. Left hand column gives the reference numeral of the pixel as shown in FIG. 3. The middle column gives the the binary power of 2 as each pixel can only have a binary power of two and not just any binary number. The right hand column gives the decimal value. Following is a binary value table for a 5 by 7 matrix. (See also FIG. 3)

| REF Num | Binary Power of 2 | Decimal Value |
|---|---|---|
| 30 | 0 | 1 |
| 32 | 1 | 2 |
| 34 | 2 | 4 |
| 36 | 3 | 8 |
| 38 | 4 | 16 |
| 40 | 5 | 32 |
| 42 | 6 | 64 |
| 44 | 7 | 128 |
| 46 | 8 | 256 |
| 48 | 9 | 512 |
| 50 | 10 | 1024 |
| 52 | 11 | 2048 |
| 54 | 12 | 4096 |
| 56 | 13 | 8192 |
| 58 | 14 | 16384 |
| 60 | 15 | 32768 |
| 62 | 16 | 65536 |
| 64 | 17 | 131072 |
| 66 | 18 | 262144 |
| 68 | 19 | 524288 |
| 70 | 20 | 1048576 |
| 72 | 21 | 2097152 |
| 74 | 22 | 4194304 |
| 76 | 23 | 8388608 |
| 78 | 24 | 16777216 |
| 80 | 25 | 33554432 |
| 82 | 26 | 67108864 |
| 84 | 27 | 134217728 |
| 86 | 28 | 268435456 |
| 88 | 29 | 536870912 |
| 90 | 30 | 1073741824 |
| 92 | 31 | 2147483648 |
| 94 | 32 | 4294967296 |
| 96 | 33 | 8589934592 |
| 98 | 34 | 17179869184 |

-continued

| REF Num | Binary Power of 2 | Decimal Value |
|---|---|---|
|  |  | 34359738367 |

The sum of all of the binary values in a 5 by 7 matrix is 2 raised to the power 35 minus 1 = 34,359,738,367. The binary value sums of the alphanumeric characters in FIGS. 4 and 5 are as follows:

4(a) = 2,143,087,391
4(b) = 2,143,087,423
4(c) = 4,290,571,039
5(a) = 1,108,575,295
5(b) = 3,256,058,943
5(c) = 7,551,288,383
5(d) = 33,321,092,159

It should be noted that binary value sums are sometimes substantially different even for minor variations in the character and at other times the difference is not so substantial for a similar variation in the character at lower pixel value position. This idiosyncracy is in no way detrimental to image recognition capability of the system because the exact match always takes preference over the goodness of fit of any other degree coupled with the fact that sum of unique number of pixels is also unique for a given size of matrix. It is for this reason the binary value sums of two different matrix sizes are not compared in this system without first appropriate compensation. Normally this does not present a problem because images can be divided so as to render the desired resolution even with a small matrix.

To assist the reader in calculation of the binary value sums of the examples used here, the following table would be helpful. It should also be noted that while in this table values are arranged vertically, it is customary to write binary values horizontally. Since the sum of all the pixels is less than 2 raised to the power 35, a 36 bit machine can conveniently handle this application without subdividing the character further.

| PIXEL NUMBER | ← FIGURE NO. → | | | | | | | Binary value |
|---|---|---|---|---|---|---|---|---|
|  | 4(a) | 4(b) | 4(c) | 5(a) | 5(b) | 5(c) | 5(d) |  |
| 30 | 1 | 1 | 1 | 1 | 1 | 1 | 1 | 1 |
| 32 | 1 | 1 | 1 | 1 | 1 | 1 | 1 | 2 |
| 34 | 1 | 1 | 1 | 1 | 1 | 1 | 1 | 4 |
| 36 | 1 | 1 | 1 | 1 | 1 | 1 | 1 | 8 |
| 38 | 1 | 1 | 1 | 1 | 1 | 1 | 1 | 16 |
| 40 | 0 | 1 | 0 | 1 | 1 | 1 | 1 | 32 |
| 42 | 0 | 0 | 0 | 0 | 0 | 0 | 0 | 64 |
| 44 | 0 | 0 | 0 | 0 | 0 | 0 | 0 | 128 |
| 46 | 1 | 1 | 1 | 0 | 0 | 0 | 0 | 256 |
| 48 | 0 | 0 | 0 | 0 | 0 | 0 | 0 | 512 |
| 50 | 0 | 0 | 0 | 1 | 1 | 1 | 1 | 1024 |
| 52 | 0 | 0 | 0 | 0 | 0 | 0 | 0 | 2048 |
| 54 | 0 | 0 | 0 | 0 | 0 | 0 | 0 | 4096 |
| 56 | 1 | 1 | 1 | 0 | 0 | 0 | 0 | 8192 |
| 58 | 0 | 0 | 0 | 0 | 0 | 0 | 0 | 16384 |
| 60 | 0 | 0 | 0 | 1 | 1 | 1 | 1 | 32768 |
| 62 | 0 | 0 | 0 | 1 | 1 | 1 | 1 | 65536 |
| 64 | 1 | 1 | 1 | 1 | 1 | 1 | 1 | 131072 |
| 66 | 0 | 0 | 0 | 1 | 1 | 0 | 0 | 262144 |
| 68 | 0 | 0 | 0 | 0 | 0 | 0 | 0 | 524288 |
| 70 | 0 | 0 | 0 | 1 | 1 | 1 | 1 | 1048576 |
| 72 | 1 | 1 | 1 | 0 | 0 | 0 | 0 | 2097152 |
| 74 | 0 | 0 | 0 | 0 | 0 | 0 | 0 | 4194304 |

| PIXEL NUMBER | ← FIGURE NO. → | | | | | | | Binary value |
|---|---|---|---|---|---|---|---|---|
| | 4(a) | 4(b) | 4(c) | 5(a) | 5(b) | 5(c) | 5(d) | |
| 76 | 0 | 0 | 0 | 0 | 0 | 0 | 0 | 8388608 |
| 78 | 0 | 0 | 0 | 0 | 0 | 0 | 0 | 16777216 |
| 80 | 0 | 0 | 0 | 1 | 1 | 1 | 1 | 33554432 |
| 82 | 1 | 1 | 1 | 0 | 0 | 0 | 0 | 67108864 |
| 84 | 0 | 0 | 0 | 0 | 0 | 0 | 0 | 134217728 |
| 86 | 0 | 0 | 0 | 0 | 0 | 0 | 0 | 268435456 |
| 88 | | | | | | | | 536870912 |
| 90 | 1 | 1 | 1 | 1 | 1 | 1 | 1 | 1073741824 |
| 92 | 0 | 0 | 1 | 1 | 1 | 1 | 0 | 2147483648 |
| 94 | 0 | 0 | 0 | 1 | 1 | 0 | 0 | 4294967296 |
| 96 | 0 | 0 | 0 | 1 | 0 | 0 | 0 | 8589934592 |
| 98 | 0 | 0 | 0 | 1 | 0 | 0 | 0 | 17179869184 |
| | | | | | | | | 34359738367 |

| TOTALS | | |
|---|---|---|
| | 4(a) = | 2,143,087,391. |
| | 4(b) = | 2,143,087,423. |
| | 4(c) = | 4,290,571,039. |
| | 5(a) = | 1,108,575,295. |
| | 5(b) = | 3,256,058,943. |
| | 5(c) = | 7,551,288,383. |
| | 5(d) = | 33,321,092,159. |

The concept of image recognition is comparable to bar code recognition. They are both binary in nature. In other words each character may be thought of as a long bar of 35 short consecutive bars. Some of which are present and others are not. Accordingly a 36 bit register can contain the entire total.

The presence or absence of mark within a pixel is a binary decision based on threshold. Even if this decision is wrong or the threshold is wrong it is not detrimental to recognition of a persons handwriting by the machine. Furthermore it is anticipated that even a person who has highly consistent handwriting will have enough variations in the line so as to give a significantly different binary value of each or same character when read by machine at different ambient conditions, and normal adjustments provided in Optical Character readers by design engineers. It is also possible that portions of line will vary in darkness, thickness, contrast and the like but none of these can effect the handwriting recognition capability of the machine to a significant degree. This is so because each caharcter has a unique binary value and if there are only say (26) characters in an image set then there are only 26 ideal character numbers out of a total of 2 to the power 35. With such gigantic tolerance in between a person need only maintain some differentiation and reasonable consistency between or among the two or three closest characters.

It is immaterial that the size of the character varies because the OCR reduces to scale which is ideal, before interpretting it. It is also envisioned that instead of a ubiquitous reader of 35 pixels the OCR has 7 cells to scan each column at clocked intervals.

The system relies on acknowledgement from the user it has accurately read the image but this acknowledgement may be as simple as any one of the following:
(a) User does not object.
(b) user inputs new image
(c) User presses space bar, enter key or the like defined key
(d) User inputs no correctional information.

It is customary to have matrixes of N by N' +n where N is an odd number such as 3,5,7 etc. and n is even number 2, 4 etc. In this system this rule may be violated without any adverse affect. Furthermore these pixels should not be too closely arranged. In fact extra space between adjacent pixels or among adjacent dots in pixel in each direction will not only make the system more economical but also more accurate. Even though normal engineering tendency is to increase the number of pixels and to mount them closer together to improve the resolution.

Since the handwriting of a person changes gradually, it would be advantageous to store last 3 samples of each character of each current user on main frame random access memory and the remaining samples can be stored on the disc. These prior samples may also be transferred back to RAM if the variation in handwriting is significant or because user has to enter many corrections manually or other similar reasons.

Color images in this system require 3 sets of binary sum for each matrix, one for each of the basic colours red, green and blue. The rest of the processing is identical.

Only the basic system has been described. Many changes may be made to it without deviating from the spirit of this inventions. Following are a few examples.
(a) Speech and speaker recognition data into binary form
(b) Voice typewriters.
(c) Microforming interfaces may be incorporated
(d) Image enhancement features may be added
(e) Line extrapolation and interpretation.
(f) correlation information eg. database of the following types
  (i) Q is always followed by U
  (ii) Word context dictionary may be used to resolve differences between e and c by reference to words such as each, beach, catch, feel
  (iii) Adjacent words dictionary may be used to resolve conflict between those words which can not be resolved by word context dictionary for example eat and cat.

Following is a listing of the processing functions, steps and pixels used in the description of the preferred embodiment arranged in the ascending order of the reference numerals. This dictionary however should not be viewed as limiting the scope of the image processing capabilities of this invention.

01: Input Device such as an OCR(Optical Character Reader).
02: Normalized or Ideal Image Input.
04: User Sample Input.
06: Actual User Input in real time.
08: User corrections input.
10: Binary power Value of pixel.
12: Control Unit.
14: Alpha numeric Sorter.
15: Working Storage and ALU (Arithmetic & Logic Unit).
16: Computation of binary value sum non binary power as a function of sum of the binary power values of the pixels on which signal is present.
17: Voice Interface.
18: Comparator.
19: Graphics Interface.
20: Presentation device, output device such as a visual display unit as shown in FIGS. 1 and 2 (cathode Ray Tube).

21: Storage of goodness of fit with adjacent and confusingly similar characters as well as realtime inputs against past inputs.
22: Storage of images sorted according to binary value
23: Alpha-numeric title and order of images.
24: Special features (such as design parameters) and procedures storage unit.
25: User Data Files and cross reference directory against multiple indices such as user number, binary value, goodness of fit etc.
26: Inactive files on tape rather than disc or main frame storage.
30-98: Pixels of a 5 by 7 matrix.
100: A 5 by 7 matrix.

Following acronyms and definitions used in this document are arranged here in alphabetical order for ready reference of the user.

ALU: Arithmatic and Logic Unit
Bit: Binary Digit
BVS: Binary power Value Sum (Aljebraic sum of binary values of pixels) Not a binary power.
I/P: Input
INTERFACE: Hardware and or software that permits two dissimilar units to operate together on-line
O/P: Output
On-line: A unit connected to another larger system electrically for bidirectional data, information exchange
RGB: Basic components of colored images i.e. red, green and blue.
OCR: Optical Character Reader
VDU: Visual Display unit. Primarily an output device.

The inventor claims:

1. An automated image input, recognition, storage output, generation and retrieval system comprising:
   (a) an input device;
   (b) an output device;
   (c) a binary value sums storage unit;
   (d) a procedures and special features (such as design parameters) storage unit;
   (e) a working storage unit;
   (f) an index storage unit;
   (g) plurality of active and inactive files storage units;
   (h) (miscellaneous) interface unit; and
   (i) a control unit connected to said input device, said output device, said binary value sums storage unit, said procedures and special features or design parameters storage unit, said working storage unit, said plurality of active and inactive files storage units, said (miscellaneous) interface unit such that each unit of the system is capable of transferring information, images and data to and from any other unit of the system individually and collectively under command signals from the control unit via said interface unit in accordance with the procedures stored in said procedures (and special features) storage unit and wherein an image to be input is comprised of a plurality of pixels, each pixel being assigned a power of two that is unique with respect to all other pixels in the image and wherein said binary value sums storage unit stores a binary sum that is the algebraic sum of each pixel of said image.

2. An automated image input, storage, and output system comprising:
   (a) first means for scanning an image;
   (b) second means for scaling said image;
   (c) third means for computing binary value sums of each image;
   (d) fourth means for storing binary value sums;
   (e) fifth means for comparing binary value sums to binary value sums of previously stored reference images;
   (f) sixth means for storage;
   (g) seventh means for calculating goodness of fit between binary value sums of various images;
   (h) eighth means for sorting and arranging images according to goodness of fit;
   (i) ninth means for presenting images to the user; and
   (j) a control unit connected to said first means, said second means said third means, said fourth means, said fifth means, said sixth means, said seventh means, said eighth means and said ninth means such that each said means is capable of transferring images and information in the form of binary data to and from any other said means individually and collectively under command signals from said control unit and wherein an image to be input is comprised of a plurality of pixels, each pixel being assigned a power of two that is unique with respect to all other pixels in the image and wherein said means for storing binary value sums stores a binary sum that is the algebraic sum of each pixel of said image.

3. An automated image, input, storage and output system of claim 3 wherein said third means for computing binary value sums consists of means for algebraically summing the binary values of each pixel of said image where a signal above a threshold is present and wherein further said pixels have only powers of 2 as binary values.

4. An automated image input, recognition, storage, output, generation, and retrieval system of claim 2 in which consecutive powers are assigned to each pixel; and wherein said goodness of fit is simply the arithmatic difference between the binary value sums of the image under consideration and said stored images; and wherein further said binary value sums are not powers of two.

5. An automated image input, recognition, storage, output, generation, and retrieval system of claim 4 wherein said images comprise alpha-numeric characters of a natural language such as English.

6. An algorithm for image recognition operable on a general purpose electronic digital computer comprising the steps of:
   (a) scanning an image;
   (b) subdividing said image into smaller images comprised of a plurality of pixels;
   (c) scaling each of said smaller images to snugly fit a matrix of M by N pixels.
   (d) assigning each pixel in said matrix a power of 2 that is unique with respect to all other pixels in said smaller image;
   (e) adding binary values of pixels with signals above a predefined threshold;
   (f) storing said binary value sums along with appropriate nomenclature, identification and recall data;
   (g) comparing binary value sums to binary value sums of previously stored images;
   (h) calculating goodness of fit as a result of the comparison in step (g) supra;
   (i) presenting images to the user in descending order of goodness of fit calculated in step (h) supra; and (j) storing correctional information in case of faulty character recogntion.

7. An algorithm for image recognition operable on a general purpose electronic digital computer of claim 5 wherein ideal image input and user sample input are processed on-line and wherein further actual user input and user correctional input are processed in realtime.

8. An algorithm for image recognition operable on a general purpose electronic digital computer of claim 6 wherein said M by N matrix is a matrix of 5 by 7 pixels, and wherein 3 binary value sums are used for each matrix for color images.

9. A process for image input, recognition, storage, generation, output and retrieval comprising:
- (a) programming an electronic digital general purpose computer to receive a plurality of bit streams of elctrical signals representing images, binary value sums, alphanumeric user data, programming instructions and special features;
- (b) programming the computer to compute; and
- (c) programming the computer to output images; wherein said programming instructions comprise the following procedural steps;
  - (a) scanning an image;
  - (b) subdividing said image into smaller images comprised of a plurality of pixels;
  - (c) scaling each of said smaller images to snugly fit an M by N matrix;
  - (d) assigning each pixel in said matrix a power of 2 that is unique with respect to all other pixels in said smaller image;
  - (e) adding binary values of pixels with signals above a predefined threshold;
  - (f) storing said binary value sums alongwith appropriate nomenclature, identification and recall data;
  - (g) comparing binary value sums to binary value sums of previously stored images;
  - (h) calculating goodness of fit as a result of the comparison in step (g) supra;
  - (i) presenting images to the user in descending order of goodness of fit calculated in step (h) supra; and
  - (j) storing correctional information in case of faulty recognition.

10. A process for handwriting recognition operable on a general purpose electronic digital computer of claim 8 wherein ideal image input and user sample input are processed on-line and wherein further actual user input and user correctional input are processed in realtime.

11. An automated image input, recognition, storage, output, generation and retrieval system comprising:
- (a) an input device;
- (b) an output device;
- (c) a binary value sums storage unit;
- (d) a procedures and design parameters storage unit;
- (e) a working storage unit;
- (f) an index storage unit
- (g) plurality of active and inactive files storage units;
- (h) interface unit; and
- (i) a control unit connected to said input device, said output device, said binary value sums storage unit, said procedures and design parameters storage unit, said working storage unit, said index storage unit, said plurality of active and inactive files storage units and said (miscellaneous) interface unit such that each unit of the system is capable of transferring information, images and data to and from any other unit of the system individually and collectively under command signals from the control unit, in accordance with the procedures stored in said procedures and design parameters storage unit, via said interface unit comprising:
  - (a) means for scanning an image;
  - (b) means for subdividing said image into smaller images comprised of a plurality of pixels;
  - (c) means for scaling each of said smaller images to snugly fit an M by N matrix;
  - (d) means for assigning each pixel in said matrix a power of 2 that is unique with respect to all other pixels in said smaller image;
  - (e) means for adding binary power values of pixels with signals above a predefined threshold to obtain non binary power sums;
  - (f) means for storing binary value sums alongwith appropriate nomenclature, identification and recall data;
  - (g) means for comparing binary value sums to binary value sums of previously stored images;
  - (h) means for calculating goodness of fit as a result of comparison in step (g) supra;
  - (i) means for presenting images to the user in descending order of goodness of fit calculated in step (h) supra; and
  - (j) means for storing correctional information in case of faulty (character) recognition.

12. An automated image input, recognition, storage, output, generation and retrieval system of claim 10 wherein ideal image input and user sample input are processed on-line and wherein further actual user input and user correctional input are processed in realtime.

13. An automated image input, recognition, storage, output, generation and retrieval system of claim 11 wherein said M by N matrix is a matrix of 5 by 7 pixels.

14. An automated image input, recognition, storage, output, generation and retrieval system of claim 10 wherein a binary value sum is an addition of binary values of each pixel of said image and wherein further pixels have only those binary values which are powers of 2.

15. An automated image input, recognition, storage, output, generation and retrieval system of claim 10 wherein a separate binary value sum is used for red, green and blue.

* * * * *